United States Patent [19]
Moore, Sr.

[11] Patent Number: 5,149,387
[45] Date of Patent: Sep. 22, 1992

[54] FLUSH MOUNTING OF THIN FILM SENSORS

[75] Inventor: Thomas C. Moore, Sr., Poquoson, Va.

[73] Assignee: Administrator of the National Aeronautics and Space Administration, Washington, D.C.

[21] Appl. No.: 699,288

[22] Filed: May 6, 1991

[51] Int. Cl.$^5$ ............................................. B29C 65/48
[52] U.S. Cl. ..................................... 156/241; 29/856; 156/285; 156/293; 264/272.15
[58] Field of Search ................. 156/79, 285, 241, 293; 29/854, 855, 856; 73/768, 775, 776, 802; 264/46.6, 46.7, 511, 272.11, 272.13, 272.15; 374/208

[56] References Cited

U.S. PATENT DOCUMENTS

| | | | |
|---|---|---|---|
| 3,428,933 | 2/1969 | Gerstenberger | 156/241 |
| 3,554,834 | 1/1971 | Bennett et al. | 156/285 |
| 4,329,779 | 5/1982 | England | 156/241 |
| 4,330,790 | 5/1982 | Burns | 29/856 |
| 4,349,281 | 9/1982 | Onksen et al. | 374/136 |
| 4,554,036 | 11/1985 | Newsom | 156/285 |
| 4,864,724 | 9/1989 | Bergstrom | 29/854 |

OTHER PUBLICATIONS

Gureev, "Method of Protecting Strain Gauges (Exchange of Experience", Ind. Lab (USA) vol. 43, No. 1 (Jan. 1977) (Publ. Jul. 1977) 73-775.

Primary Examiner—Michael W. Ball
Assistant Examiner—Steven D. Maki
Attorney, Agent, or Firm—George F. Helfrich

[57] ABSTRACT

Flush mounting of a sensor on a surface is provided by first forming a recessed area on the surface. Next an adhesive bonding mixture is introduced into the recessed area. The adhesive bonding mixture is chosen to provide thermal expansion matching with the surface surrounding the recessed area. A strip of high performance polymeric tape is provided, with the sensor attached to the underside thereof, and the tape is positioned over the recessed area so that it acts as a carrier of the sensor. A shim having a flexibility so that it will conform to the surface surrounding the recessed area is placed over the tape, and a vacuum pad is placed over the shim. The area above the surface is then evacuated while holding the sensor flush with the surface during curing of the adhesive bonding mixture. After such curing, the pad, shim, and tape are removed from the sensor, electrical connections for the sensor are provided, after which the remaining space in the recessed area is filled with a polymeric foam.

10 Claims, 1 Drawing Sheet

FLUSH MOUNTING OF THIN FILM SENSORS

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

1. Field of the Invention

The present invention relates generally to a method of flush mounting a sensor, especially a thin film sensor, on an aerodynamic surface where surface conformity is essential.

2. Description of the Related Art

A number of methods exist for the mounting of sensors on aerodynamic surfaces of aircraft, wind tunnel models, and the like, where surface conformity is essential. Most of these methods require the accurate machining of a recessed area to precisely accommodate the sensor, followed by application of a fastening agent such as epoxy cement to hold the sensor precisely at the surface. Several disadvantages are presented by such an approach. First, the machining of a recess to a predetermined depth, uniformly on a curved surface, is a difficult and expensive process. Second, the fastening agent—e.g., epoxy cement—changes in volume upon setting, often resulting in a sensor installation that is not precisely at the surface. Third, unless the fastening agent—e.g., epoxy cement—is extended with an appropriate filler to provide thermal expansion matching, sensor failure can occur as a result of thermal stresses from temperature excursions associated with flight and wind tunnel testing.

SUMMARY OF THE INVENTION

It is accordingly the primary object of the present invention to provide a process for the flush mounting of a sensor, especially a thin film sensor, on an aerodynamic surface, which process obviates the difficulties and disadvantages of the prior art. This object and its attending advantages and benefits are achieved by the provision of a process which is the cooperative combination of the following procedural steps:

A. Forming a recessed area on an aerodynamic surface, e.g., a fiberglass glove which is attached to a wing for use in studying natural laminar flow;

B. Introducing an adhesive bonding mixture into the recessed area which provides thermal expansion matching with the surrounding aerodynamic surface, the adhesive bonding mixture comprising advantageously thermosetting epoxy cement and amorphous fumed silica, the amount of which will vary in accordance with the coefficient of thermal expansion of the surface;

C. Providing a strip of high performance polymeric tape, e.g., polyimide tape, with the sensor to be mounted attached to the underside thereof, the strip of high performance polymeric tape being positioned over the recessed area so that the tape acts as a carrier for the sensor;

D. Providing a shim, e.g., of stainless steel, having a flexibility so that it will conform to the aerodynamic surface surrounding the recess, the shim being positioned over the strip of high performance polymeric tape;

E. Covering the shim with a vacuum pad to evacuate the area above the aerodynamic surface and hold the sensor flush with the aerodynamic surface during curing of the adhesive bonding mixture;

F. After curing of the adhesive bonding mixture, removing the vacuum pad, shim, and high performance polymeric tape, then attaching leads from the sensor to terminal pins, followed by filling remaining space in the recessed area with a polymeric foam, e.g., liquid urethane foam, and applying adhesive bonding mixture over the cured foam and curing the same to seal the entire assembly.

Significant advantages of the process of the present invention are: (1) the need for accurate machining of a recessed area for the sensor has been eliminated. In this regard, it should be noted that even with accurate machining, there is no guarantee of surface conformity using methods of the prior art to mount the sensor. (2) The employment of an adhesive bonding mixture which provides thermal expansion matching that of the surrounding aerodynamic surface helps prevent failures in the sensor backing which would result in failure of the sensor. (3) The employment of a polymeric foam fills remaining space in the recessed area without producing any large thermally induced stresses on sensor leads.

Although specially suitable for the flush mounting of thin film sensors, the method of the present invention has utility in the mounting of other sensors, e.g., probe type aerodynamic flow sensors, resistance-type temperature sensors, and strain gauges, among others.

BRIEF DESCRIPTION OF THE DRAWINGS

For a more complete understanding of the present invention, including its primary object and attending benefits, reference should be made to the Description of the Preferred Embodiments which follows. This description should be read together with the accompanying drawings, wherein.

DESCRIPTION OF THE PREFERRED EMBODIMENTS

Figure 1:
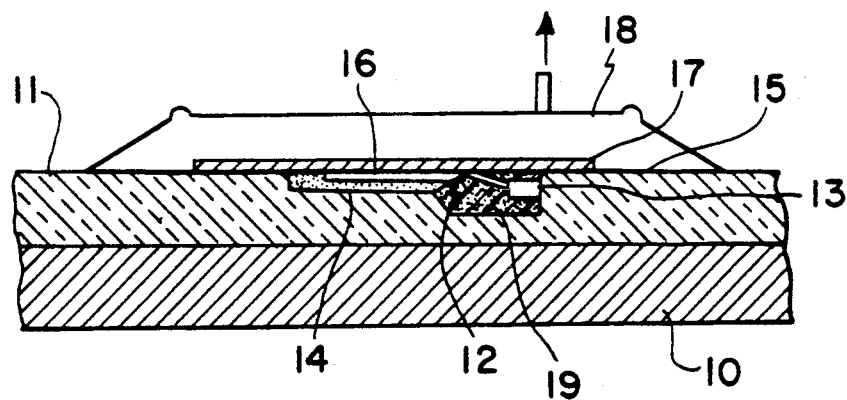
FIG. 1 is a schematic which illustrates the process of the present invention as applied to the flush mounting of a thin film sensor on a glove which has been attached to an aerodynamic surface, e.g., the wing of an aircraft.

Referring now to the drawings, FIG. 1 shows an aircraft wing 10 to which fiberglass glove 11 is attached for use in studying laminar flow. A recessed area 12 in glove 11 is formed, as by routing out, and terminal pins 13 are installed therein. Adhesive bonding mixture 14 is chosen to provide thermal expansion matching with the surrounding aerodynamic surface 11, and advantageously comprises thermosetting epoxy cement and amorphous fumed silica. About 100 parts by volume of GA-2 ™ epoxy cement, which is available commercially, and about 70 parts by volume of Cab-O-Sil ® filler, which is also available commercially have been used with particular success when glove 11 is fiberglass.

A strip of high performance polymeric tape 15 is provided, to the underside of which is attached the sensor 16 which is to be mounted in recessed area 12. The sensor 16 shown here is a thin film sensor. However, other sensors, such as probe-type aerodynamic flow sensors, resistance-type temperature sensors, and strain gauges may also be employed. High performance polymeric tape 15 is advantageously a polyimide tape such as Kapton® polyimide, which is available commercially. High performance polymeric tape 15 is positioned over recessed area 12 so that it acts as a carrier for sensor 16. Shim 17 is then placed over high performance polymeric tape 15. Shim 17, which is preferably of stainless steel, should have a flexibility so that it will conform to the surface of glove 11 over which it is positioned.

Shim 17 is now covered with vacuum pad 18, and the area above the surface of glove 11 is evacuated, whereby sensor 16 is held flush with the surface of glove 11 while adhesive bonding mixture 14 is being cured.

After adhesive bonding mixture 14 is cured completely, vacuum pad 18 is removed, followed by shim 17, and high performance polymeric tape 15 is then peeled away from sensor 16. Leads are then attached from sensor 16 to terminal pins 13, after which the remaining space is recessed area 12 is filled to within 0.010 inches of the surface surrounding the recessed area with polymeric foam 19, which is advantageously a liquid urethane foam. Finally adhesive bonding mixture 14 is applied over polymeric foam 19 and cured to seal the entire installation.

Figure 2:
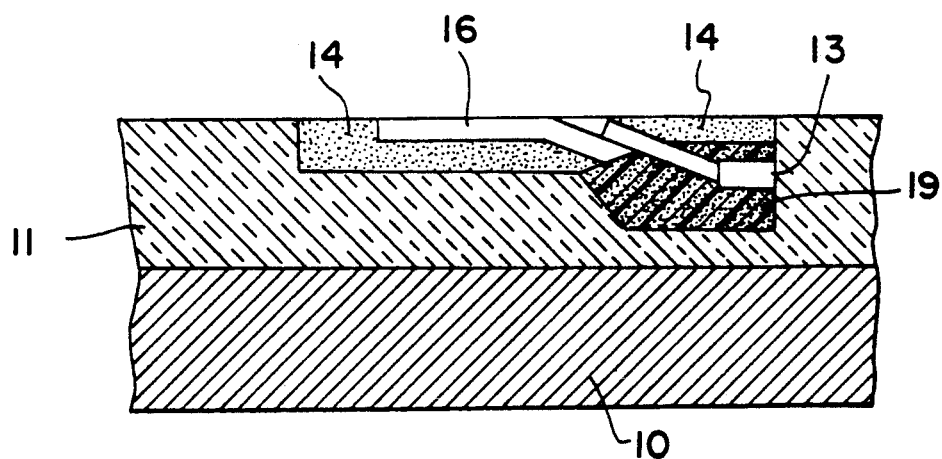
FIG. 2 is a schematic which illustrates the completed flush mounting of the thin film sensor.

FIG. 2 shows the completed flush mounting of thin film sensor 16 in glove 11 attached to wing 10. The functions of adhesive bonding mixture 14 and polymeric foam 19 are seen, as is the communication between sensor 16 and terminal pins 13.

What is claimed is:

1. A process for the flush mounting of a sensor in a recessed area of a surface, which process comprises:
   introducing an adhesive bonding mixture into the recessed area, the adhesive bonding mixture providing thermal expansion matching with the surface surrounding the recessed area;
   providing a strip of high performance polymeric tape with the sensor to be mounted attached to the underside thereof, the strip of high performance polymeric tape being positioned over and covering the recessed area so that the tape acts as a carrier for the sensor;
   providing a shim having a flexibility so that it will conform to the surface surrounding the recessed area, the shim being positioned over and covering the strip of high performance polymeric tape;
   covering the shim with a vacuum pad, curing the adhesive bonding mixture and evacuating the area above the surface while holding the sensor flush with the surface during curing of the adhesive bonding mixture;
   after curing of the adhesive bonding mixture, removing the vacuum pad and shim, and peeling the high performance polymeric tape away from the sensor;
   providing electrical connections for the sensor followed by filling remaining space in the recess area with a polymeric foam, then applying the adhesive bonding mixture over the polymeric foam and curing the polymeric foam.

2. The process of claim 1, wherein the surface is an aerodynamic surface.

3. The process of claim 2, wherein the aerodynamic surface is a glove which is attached to a wing for use in studying natural laminar flow.

4. The process of claim 3, wherein the glove is a fiberglass glove.

5. The process of claim 4, wherein the adhesive bonding mixture comprises epoxy cement and amorphous fumed silica.

6. The process of claim 5, wherein components of the adhesive bonding mixture are present in amounts providing about 100 parts by volume of thermosetting epoxy cement and about 70 parts by volume of amorphous fumed silica.

7. The process of claim 1, wherein the high performance polymeric tape is a polyimide tape.

8. The process of claim 1, wherein the shim is a stainless steel shim.

9. The process of claim 1, wherein the polymeric foam is a liquid urethane foam.

10. The process of claim 1, wherein the sensor is a thin film sensor.

* * * * *